(12) United States Patent
Mangano

(10) Patent No.: US 10,088,333 B2
(45) Date of Patent: Oct. 2, 2018

(54) METHOD AND SYSTEM FOR GYROSCOPE REAL-TIME CALIBRATION

(71) Applicant: STMicroelectronics S.r.l., Agrate Brianza (IT)

(72) Inventor: Daniele Mangano, San Gregorio di Catania (JP)

(73) Assignee: STMicroelectronics S.R.L., Agrate Brianza (IT)

( * ) Notice: Subject to any disclaimer, the term of this patent is extended or adjusted under 35 U.S.C. 154(b) by 1101 days.

(21) Appl. No.: 14/444,920

(22) Filed: Jul. 28, 2014

(65) Prior Publication Data

US 2015/0033821 A1 Feb. 5, 2015

(30) Foreign Application Priority Data

Jul. 30, 2013 (IT) .............................. TO2013A0645

(51) Int. Cl.
*G01D 18/00* (2006.01)
*G01D 21/00* (2006.01)
(Continued)

(52) U.S. Cl.
CPC ........... *G01C 25/005* (2013.01); *G01C 19/00* (2013.01); *G01C 21/10* (2013.01); *G01C 21/12* (2013.01);
(Continued)

(58) Field of Classification Search
CPC ...... G01C 19/00; G01C 25/005; G01C 21/10; G01C 21/12; G01C 21/16; G01C 21/18; G01C 25/00; G01P 21/00
See application file for complete search history.

(56) References Cited

U.S. PATENT DOCUMENTS 5,194,872 A * 3/1993 Musoff .................... B64G 1/28
342/358
5,854,843 A * 12/1998 Jacknin ................... H04S 1/007
381/309
(Continued)

FOREIGN PATENT DOCUMENTS

EP  1 624 285 A1  2/2006
EP  1 959 234 A1  8/2008
EP  2 306 149 A1  4/2011

OTHER PUBLICATIONS

Glueck et al., "Automatic realtime offset calibration of gyroscopes," IEEE Sensors Applications Symposium (SAS), Galveston, TX, Feb. 19-21, 2013, pp. 214-218.
(Continued)

*Primary Examiner* — David M Gray
*Assistant Examiner* — Geoffrey T Evans
(74) *Attorney, Agent, or Firm* — Seed IP Law Group LLP

(57) ABSTRACT

A method for real-time calibration of a gyroscope, configured for supplying a value of angular velocity that is function of a first angle of rotation about a first angular-sensing axis that includes defining a time interval, acquiring from an accelerometer an equivalent value of angular velocity that can be associated to the first angle of rotation; calculating a deviation between the value of angular velocity and the equivalent value of angular velocity; iteratively repeating the previous steps through the time interval, incrementing or decrementing an offset variable by a first predefined value on the basis of the values assumed by the deviations during the iterations, and updating the value of angular velocity as a function of the offset variable.

21 Claims, 8 Drawing Sheets

(51) Int. Cl.
  *G01P 21/00* (2006.01)
  *G01R 35/00* (2006.01)
  *G01C 25/00* (2006.01)
  *G01C 19/00* (2013.01)
  *G01C 21/10* (2006.01)
  *G01C 21/18* (2006.01)
  *G01C 21/12* (2006.01)
  *G01C 21/16* (2006.01)

(52) U.S. Cl.
  CPC ............ *G01C 21/16* (2013.01); *G01C 21/18* (2013.01); *G01C 25/00* (2013.01); *G01P 21/00* (2013.01)

(56) References Cited

U.S. PATENT DOCUMENTS

| | | | |
|---|---|---|---|
| 6,853,947 B1 * | 2/2005 | Horton | G01C 21/16 702/150 |
| 7,827,864 B2 | 11/2010 | Prandi et al. | |
| 2002/0169553 A1 * | 11/2002 | Perlmutter | G01C 21/165 701/472 |
| 2009/0295722 A1 * | 12/2009 | Yamamoto | G06F 3/0346 345/158 |
| 2010/0013937 A1 * | 1/2010 | Washisu | G03B 5/00 348/208.2 |
| 2011/0178707 A1 | 7/2011 | Sachs et al. | |
| 2013/0158928 A1 * | 6/2013 | Hogdal | G01C 21/20 702/104 |
| 2014/0202229 A1 * | 7/2014 | Stanley | G01C 25/005 73/1.79 |

OTHER PUBLICATIONS

Roy et al., "Soft Input Soft Output Kalman Equalizer for MIMO Frequency Selective Fading Channels," *IEEE Transactions on Wireless Communications* 6(2):506-514, Feb. 2007.

Welch et al., "An Introduction to the Kalman Filter," University of North Carolina at Chapel Hill Department of Computer Science, TR 95-041, Jul. 24, 2006, 16 pages.

\* cited by examiner

METHOD AND SYSTEM FOR GYROSCOPE REAL-TIME CALIBRATION

BACKGROUND

Technical Field

The present disclosure relates to a method and system for real-time calibration of a gyroscope.

Description of the Related Art

In the state of the art inertial-measurement units or systems (IMUs or IMSs) are known, which typically comprise a triaxial gyroscope and a triaxial acceleration sensor (accelerometer), which are designed to measure, respectively, movements of a rigid body in a reference system centered on the rigid body itself (rotations) and movements of the rigid body with respect to the Earth's reference system (accelerations). Other inertial-measurement systems further comprise a magnetometer. See, for example, FIG. 1, which is a schematic illustration of an inertial-measurement system 2 including a gyroscope 3, an accelerometer 4, a magnetometer 5, and an ASIC 6, which controls, in use, the gyroscope 3, the accelerometer 4, and the magnetometer 5, receives the signals generated thereby, and interprets said signals.

MEMS technology has favored miniaturization of low-cost accelerometers and gyroscopes so that these sensors are now widely used in mobile devices of a consumer type.

At the end of the steps of manufacture and integration of accelerometers 4 and gyroscopes 3 in one and the same mobile device, the accelerometers 4 and the gyroscopes 3 are calibrated so as to make up, at least in part, for systematic errors generated by the manufacturing process.

However, the factors that affect systematic errors are multiple, and some of them are unpredictable and subject to parameters that may vary during the service life of the sensor. For instance, stresses introduced by soldering, shocks, and temperature variations are some of the main causes of errors that cannot be compensated for a priori.

As regards the gyroscope 3, in particular, the present applicant has found that the value of angle of rotation about each axis presents a component of error, or drift, which varies during the service life of the gyroscope, and in particular increases over time.

There have been proposed a wide range of techniques of self-calibration of gyroscopes for compensating the variation of drift during the service life of the sensor. Some of them are based on merging, by means of a Kalman filter, of data detected by GPS with the measurements obtained from the gyroscope 3. This solution presents the disadvantage of requiring reception of a good GPS signal, which is not always available, and dedicated hardware, with consequent increase in the price of the end product and high levels of electric-power consumption.

Other techniques envisage the comparison between redundant measurements obtained from accelerometers 4 and/or magnetometers 5 housed in the same mobile device that houses the gyroscope 3. However, since the gyroscope 3, accelerometer 4, and magnetometer 5 operate in reference systems different from one another, it is important to envisage a step of conversion between the reference systems, which typically uses a high processing capacity that is not always available.

Yet a further technique, described in the document by Manuel Glueck et al., "Automatic realtime offset calibration of gyroscopes", Robert Bosch GmbH, Corporate Research, 70049 Stuttgart, Germany, envisages the use of redundant data obtained from gyroscope and accelerometer measurements for real-time calibration of the gyroscope. However, this calibration technique is based upon the assumption that the output from the gyroscope is zero if the mobile device is in a static position. In other words, it is not applicable during movement of the mobile device, with evident limitations. Furthermore, to verify when the mobile device is in a static position, a sophisticated system of motion recognition is used, which complicates the hardware construction of the system as a whole.

BRIEF SUMMARY

The present disclosure is directed to a method and a system for real-time calibration of a gyroscope that will be able to overcome the drawbacks of the prior art.

One embodiment of the present disclosure includes calibrating in real-time calibration a gyroscope that is configured to supply a value of angular velocity that is a function of a first rotation angle about a first angular-sensing axis. The calibrating includes defining a discrete time interval including a plurality of temporal sub-units, each of them having a duration defined by a clock signal, acquiring from an accelerometer, in a first temporal sub-unit, respective values of acceleration along a first acceleration-sensing axis and a second acceleration-sensing axis of the accelerometer, calculating, in said first temporal sub-unit, on the basis of said acceleration values, an equivalent value of angular velocity that can be associated to said first rotation angle, calculating, in said first temporal sub-unit, a deviation between the value of angular velocity and said equivalent value of angular velocity, on the basis of the value of said deviation, updating the value of a counter variable, iteratively repeating the defining, the acquiring, the calculating the equivalent value of angular velocity, the calculating the deviation, and the updating of the value of the counter variable for temporal sub-units subsequent to the first temporal sub-unit up to the end of said time interval, on the basis of the value of the counter variable, incrementing or decrementing an offset variable by a first value, and updating said value of angular velocity as a function of said offset variable.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 1:
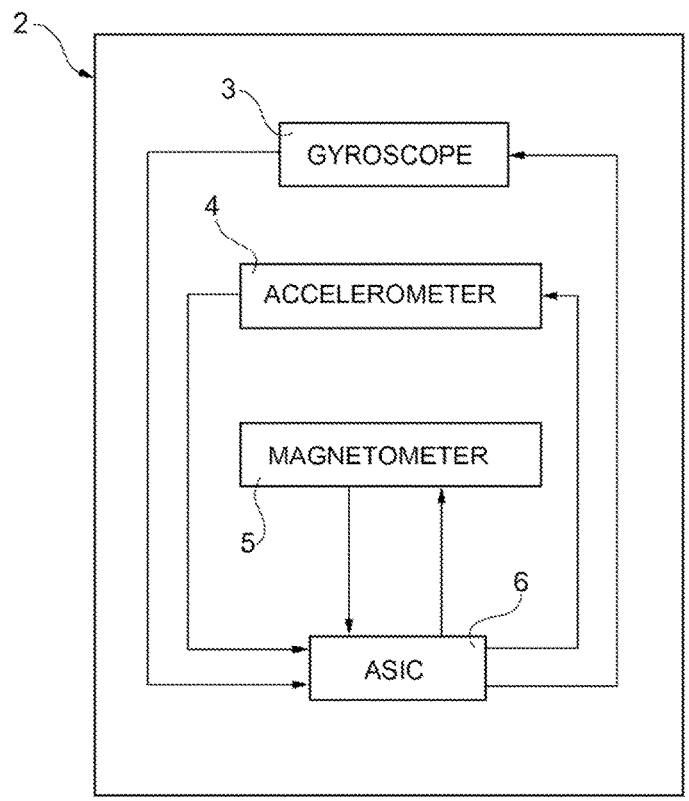
FIG. 1 shows an inertial-measurement system including, in integrated form, a gyroscope, an accelerometer, a magnetometer, and an ASIC, according to an embodiment of a known type.

A gyroscope (for example the gyroscope 3 of FIG. 1) is a microelectromechanical structure comprising at least one mobile mass, connected to a fixed body (stator) by means of springs, and mobile with respect to the stator according to pre-set degrees of freedom. The mobile mass is moreover coupled to the fixed body via capacitive structures (capacitors). The movement of the mobile mass with respect to the fixed body, for example on account of an external stress, modifies the capacitance of the capacitors, whence it is possible to derive the relative displacement of the mobile mass with respect to the fixed body and hence the force applied. Conversely, by supplying appropriate biasing voltages, it is possible to apply an electrostatic force to the mobile mass to set it in motion.

In order to function, the gyroscope 3 comprises a driving device that has the task of keeping the mobile mass in oscillation. For instance, in a way in itself known, it is possible to provide, in open loop, periodic stresses at the resonance frequency of the MEMS structure. Alternatively, it is possible to use driving circuits with feedback control, based upon the use of sigma-delta modulators. Other solutions are moreover possible. Gyroscopes possess an electromechanical structure that typically comprises two masses mobile with respect to the stator and coupled to one another so as to have a relative degree of freedom. The two mobile masses are both capacitively coupled to the stator. One of the mobile masses is dedicated to driving (driving mass) and is kept in oscillation at the resonance frequency. The other mobile mass (sensing mass) is drawn in oscillatory motion and, in the case of rotation of the microstructure with respect to a pre-set axis with an angular velocity, it is subjected to a Coriolis force proportional to the angular velocity itself. In practice, the sensing mass operates like an accelerometer that enables detection of the Coriolis force. To enable actuation and provide an electromechanical oscillator in which the sensor performs the role of selective frequency amplifier, with a second-order transfer function of a low-pass type and high quality factor, the driving mass is provided with two types of differential capacitive structures: driving electrodes and driving-sensing electrodes. The driving electrodes have the purpose of sustaining self-oscillation of the mobile mass in the direction of actuation. The driving-sensing electrodes have the purpose of measuring, through the transduced charge, the position of translation or rotation of the sensing mass in the direction of actuation.

The U.S. Pat. No. 7,305,880 describes a system of control of the velocity of oscillation of the gyroscope, which comprises a reading system including a differential read amplifier, a highpass amplifier, and an actuation and control stage, operating in a continuous-time way. All the components that form the reading system are of a discrete-time analog type and, in particular, are obtained by means of fully differential switched-capacitor circuits.

The U.S. Pat. No. 7,827,864 describes an improvement of the above control system, where the control loop comprises a filter having the purpose of reducing the offset and the effects of parasitic components and couplings by operating on the overall gain and phase of the feedback loop.

Figure 2:
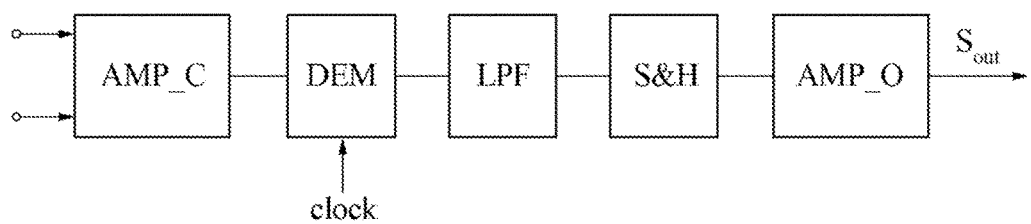
FIG. 2 shows an output stage of a gyroscope, according to an embodiment of a known type.

FIG. 2 is a schematic illustration of a reading system for reading the signal generated at output by a gyroscope according to one embodiment of a known type. The reading system comprises a charge amplifier AMP_C, a demodulator DEM, a low-pass filter LPF, a sample-and-hold stage S&H, and an output amplifier AMP_O, cascaded to one another. The charge amplifier AMP_C and the demodulator DEM are of a fully differential switched-capacitor type. The charge amplifier AMP_C has inputs connected to the terminals of the sensing mass, for receiving read currents (or packets of charge) correlated to the linear velocity of oscillation of the sensing mass. According to the operation of the charge amplifier AMP_C, present on its outputs are read voltages indicating the displacement of the sensing mass. The signal supplied at output by the charge amplifier AMP_C is an amplitude-modulated signal.

The demodulator DEM receives the read voltages supplied by the charge amplifier AMP_C and carries out, in a known way, a demodulation of the signal received. The output of the demodulator DEM is supplied to the filter LPF and, then, to the sample-and-hold stage S&H, which carries out sampling, in a known way. The signal sampled is then supplied to the output amplifier AMP_O, which generates the output signal $S_{out}$.

According to an alternative embodiment, the gyroscope is of a digital type. In this case, the read stage is also digital, and hence the demodulation and sample-and-hold stages are not present.

The output signal $S_{out}$ is a signal indicating an angular velocity $\omega_k$, where k=x, y, z in the case of a triaxial gyroscope 3. In other words, a triaxial gyroscope 3 generates at output three signals $S_{out}$, one for each sensing axis x, y, z. The angular velocity $\omega_x$ hence relates to the sensing axis x, the angular velocity $\omega_y$ relates to the sensing axis y, and the angular velocity $\omega_z$ relates to the sensing axis z.

In general, for each axis x, y, z considered, the following relation (1) applies:

$$\omega_k = \omega_{k\_t} + \text{OFF}(t) \tag{1}$$

where $\omega_{k\_t}$ is the real value of angular velocity about the respective axis, and OFF(t) is a time-variable error, or offset, or drift that afflicts the signal generated by the gyroscope, thus perturbing the measurement.

From Eq. (1) the value of the respective angle of rotation $A_x$, $A_y$, $A_z$ (in general $A_k$, where k=x, y, z) about the respective sensing axis x, y, z is obtained, according to the following relation (2):

$$A_k = \int \omega_k = \int \omega_{k\_t} dt + \int \text{OFF}(t) dt = A_{k\_t} + \text{Err} \tag{2}$$

where $A_{k\_t}$ is the "true" angle (i.e., without error) for each axis x, y, z, and Err is a variable that identifies the error. In particular, $A_{x\_t}$ is the angle of roll (about x), $A_{y\_t}$ is the angle of pitch (about y), and $A_{z\_t}$ is the angle of yaw (about z).

Typically, the signal $S_{out}$ at output from the gyroscope is a digital signal; in this case, Eq. (2) is computed on digital samples, according to the known method of operation of a digital integrator, by means of an operation of addition sample by sample in a given time interval $\Delta T$:

$$A_k(i) = A_k(i-1) + w_{k\_t}(i) \cdot \Delta T \tag{3}$$

where $A_k(i-1)$ and $w_{k\_t}(i)$ are, respectively, the angle of rotation (about the axis k=x, y, z) at the instant i–1 (i.e., the result of the same iterative formula at the previous instant) and the velocity of rotation (about the axis k=x, y, z) generated at output by the gyroscope; ΔT is the ODR (output date rate), i.e., the sampling time used for generating the digital samples of the angular velocity produced by the gyroscope (clock signal in FIG. 2). In this case, the value of ΔT corresponds to the clock signal common to the entire inertial-measurement system 2 (all the blocks that make it up are synchronous). In general, the value of ΔT may be different from the clock period.

Figure 3:
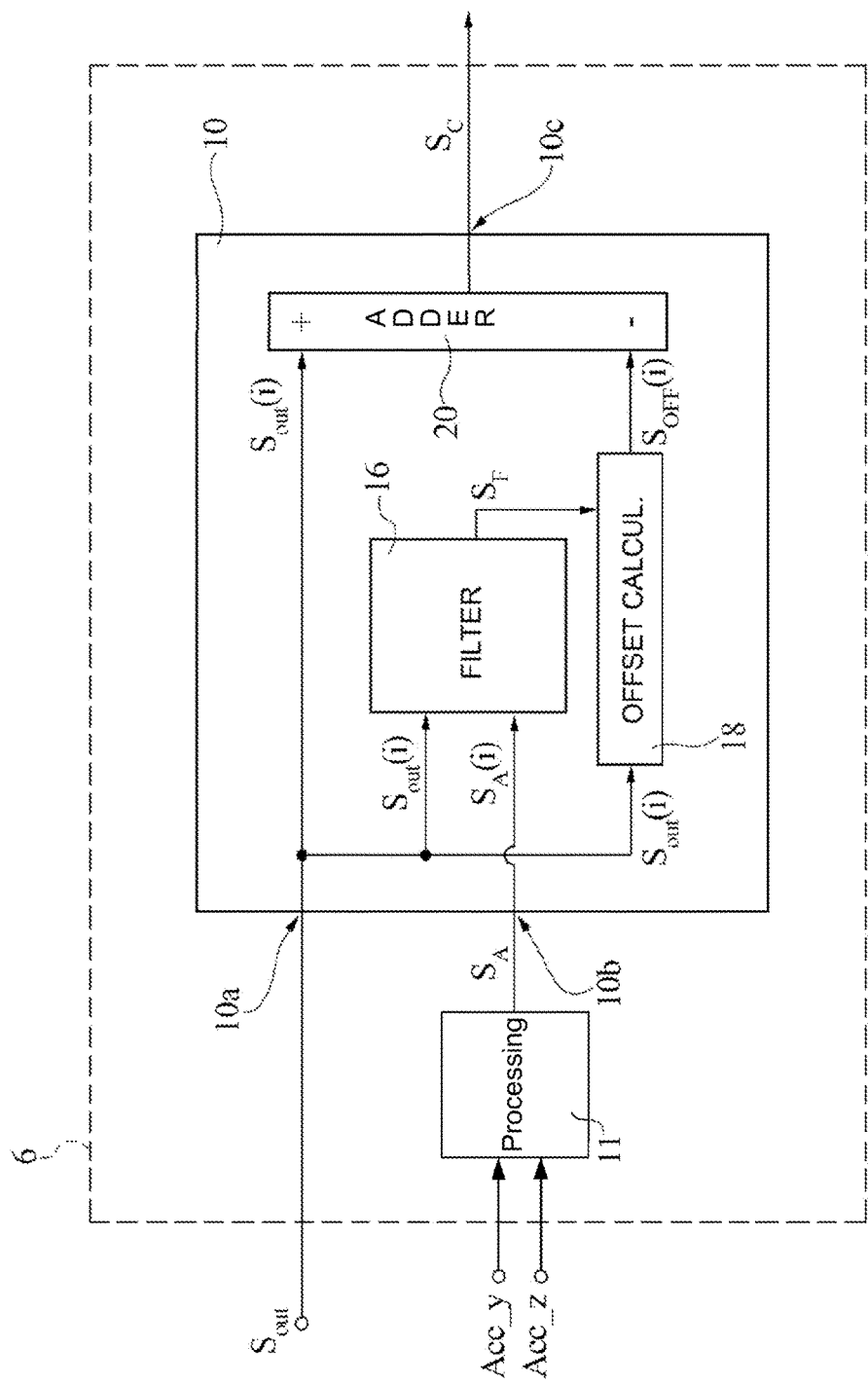
FIG. 3 is a schematic illustration of a system for calibration of the gyroscope of FIG. 1, according to one embodiment of the present disclosure.

FIG. 3 shows, according to one aspect of the present disclosure, a signal-processing block 10, in particular integrated, or integratable, in the ASIC 6 of FIG. 1. The signal-processing block 10 has a first input 10a and a second input 10b, which are designed to receive, respectively, the signal $S_{out}$, which is a signal of angular velocity generated by the gyroscope 3, and a signal $S_A$, which is a signal identifying an equivalent angle and is generated by a processing block 11 on the basis of the signals received from the accelerometer 4 and/or from the magnetometer 5.

The signal-processing block 10 receives at input the signal $S_{out}$ for just one of the axes x, y and z. In the case of a triaxial gyroscope, three signal-processing blocks 10 should be envisaged, one for each axis x, y, z.

In detail, the processing block 11 is configured for generating, on the basis of the measurements of acceleration supplied at output by the triaxial accelerometer 4, a value of angle that is substantially equivalent to the angle (roll, pitch, yaw) measured by the gyroscope 3 about each respective axis of measurement x, y, z.

In detail, the equivalent angle of roll (about x) A_eq_x is obtained as $$A\_eq\_x = arctg(Acc\_y/Acc\_z)$$

where Acc_y is the acceleration along the axis y measured by the accelerometer 4, and Acc_z is the acceleration along the axis z measured by the accelerometer 4.

The equivalent angle of pitch (about y) A_eq_y is obtained as $$A\_eq\_y = arctg(Acc\_x/Acc\_z)$$

where Acc_x is the acceleration along the axis x measured by the accelerometer 4, and Acc_z is the acceleration along the axis z measured by the accelerometer 4.

The equivalent angle of yaw (about z) A_eq_z can be calculated starting from the accelerations only if none of the three axes of the gyroscope 3 is aligned to the gravity vector (and, only in this case, $A\_eq\_z = arctg(A_y/A_x)$). In general, the equivalent angle of yaw A_eq_z can be obtained in all the possible conditions also by exploiting the information coming from the magnetometer 5 through the following relation:

$$A\_eq\_z = arctg(Yh/Xh)$$

where $$Xh = Xm \cdot cos(A\_eq\_y) + Zm \cdot sin(A\_eq\_y)$$

and $$Yh = Xm \cdot sin(A\_eq\_x) \cdot sin(A\_eq\_x) + Ym \cdot cos(A\_eq\_x) - Zm \cdot sin(A\_eq\_x) \cdot cos(A\_eq\_y)$$

where Xm, Ym and Zm are the magnetic components along the three axes, respectively, x, y, z.

It should be noted that, when the aforementioned formulas for calculation of A_eq_x, A_eq_y and A_eq_z are computed using the computing software, it is expedient to use the known function "Arctg2" or "A tan 2" for calculating the arctangent, in so far as said function is able to distinguish between diametrically opposite angles, taking into account not only of the ratio between the arguments but also their sign. In fact, the function "Arctg2" enables determination not only of the amplitude of the angle but also its effective positioning with respect to the quadrants of the Cartesian axes.

The gyroscope 3, as has been said, supplies signals $S_{out}$ of angular velocity about each axis x, y, z in a reference system fixed with respect to the inertial-measurement system 2, whereas the accelerometer 4 supplies signals of acceleration along respective axes x, y, z in a reference system different from the reference system of the gyroscope 3. Likewise, also the magnetometer 5 supplies signals in a respective reference system.

The signal-processing block 10 further comprises a filter 16, an offset-calculation block 18 and an adder 20, the latter coupled to an output 10c of the signal-processing block 10, for supplying a signal $S_C$ correlated to the signal $S_{out}$ and where the noise or error component is (at least partially) compensated. The compensation takes place in real time.

According to one embodiment, the filter 16 is a Kalman filter, of a type in itself known, designed to receive at input the signal $S_{out}$ to obtain from the signal $S_{out}$ the corresponding angle of rotation (carrying out an operation of integration according to Eq. 3), receive the signal $S_A$, and supply at output a filtered signal $S_F$ that corresponds to the integral of the signal $S_{out}$ (i.e., to the angle of rotation obtained by measurements of the gyroscope), where the offset component due to the drift of the signal of the gyroscope is partially reduced on the basis of the information obtained from the signal $S_A$. The filtered signal $S_F$ cannot in any case be used instead of the signal $S_{out}$ since, as has been said, the gyroscope and the accelerometer operate in respective reference systems. In any case, $S_{out}$ is an angular velocity, whereas $S_F$ is a value of angle.

According to a different embodiment, the filter 16 is a low-pass filter, the cutoff frequency of which is chosen on the basis of the particular device, and is designed to filter the only signal $S_A$ so as to clean it of high-frequency spurious (non-useful) components. In this case, the output $S_F$ of the filter 16 is the signal $S_A$ cleaned of the high-frequency components.

According to a further embodiment, forming part of the present disclosure, the filter 16 is a filter based upon the Kalman algorithm, but optimized so as to reduce the computational complexity. This embodiment of the filter 16 is described in what follows, in particular with reference to FIGS. 7 and 8.

Figure 5:
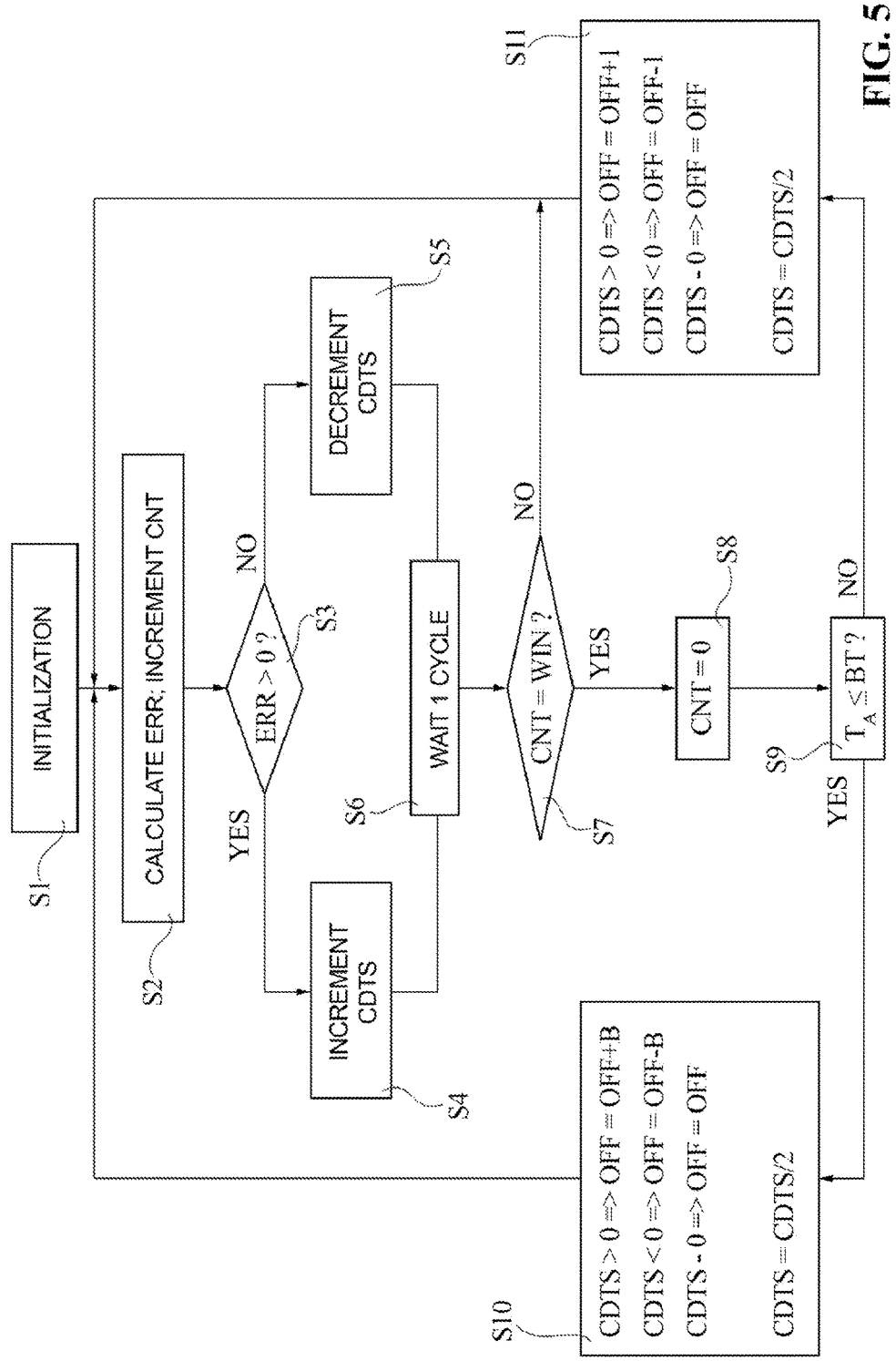
FIG. 5 is a flowchart of a method for calculating the error, or drift, that afflicts the signal at output from the gyroscope of FIG. 1, according to one aspect of the present disclosure.

According to one aspect of the present disclosure, the offset-calculation block 18 is configured for implementing the method of FIG. 5 and is configured for receiving at input the filtered signal $S_F$ and the signal $S_{out}$ and generating at output an offset signal $S_{OFF}$ indicating the value of offset (drift) that afflicts the signal $S_{out}$. The adder 20 is configured for receiving at input the signal $S_{out}$ and the offset signal $S_{OFF}$ and generating at output the signal $S_C$, which is the signal $S_{out}$ deprived of the offset component $S_{OFF}$ thus calculated.

Figure 4:
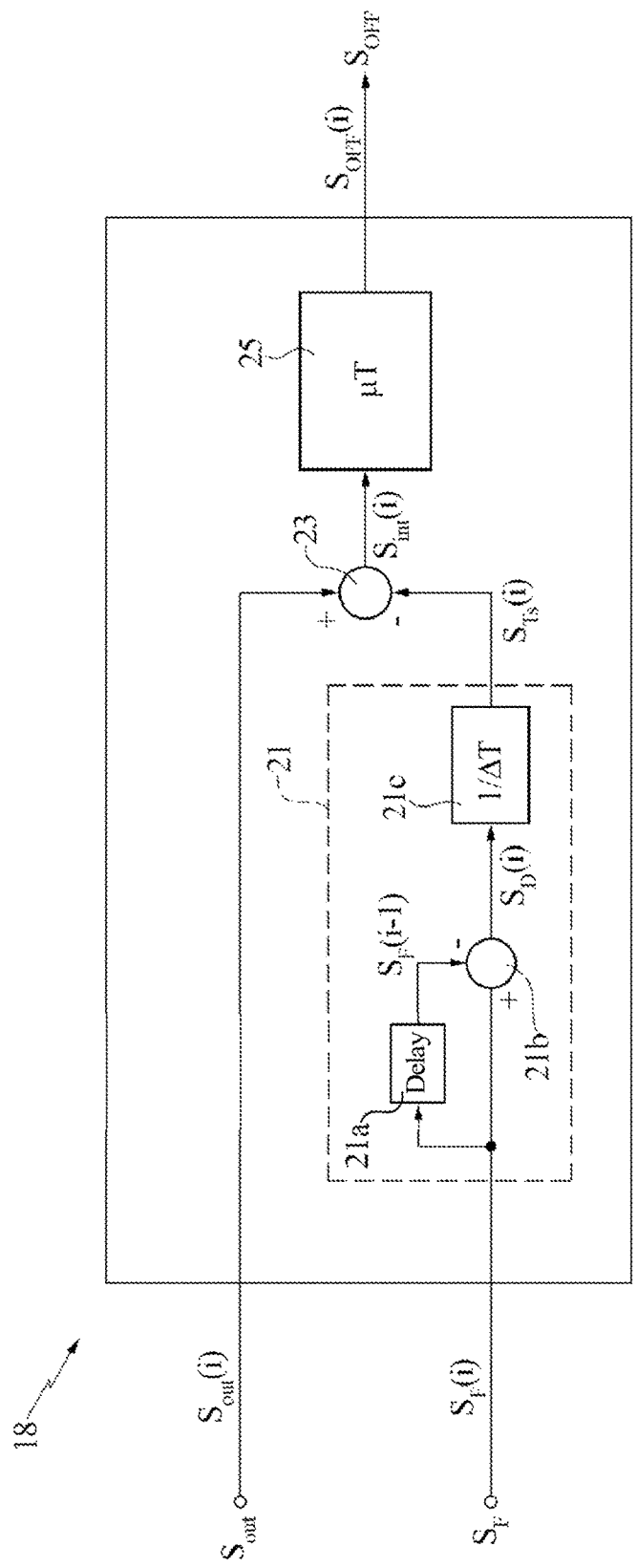
FIG. 4 is a schematic illustration of an embodiment of a processing block designed to calculate an error, or drift, that afflicts the signal at output from the gyroscope of FIG. 1, according to one aspect of the present disclosure.

With reference to FIG. 4, the offset-calculation block 18 comprises a differentiator 21, an adder 23, and a processing logic 25. Since the signal $S_{out}$ at output from the gyroscope is a digital signal, the differentiator 21 operates on digital values, and is a differentiator of a type in itself known. The offset-calculation block 18 receives at input the filtered signal $S_F$ and the signal $S_{out}$.

In the framework of the present disclosure, since the signals of interest are digital signals, in what follows, the index "i" will be used for identifying a generic i-th sample of the respective signal, and the index "i−1" for indicating the immediately preceding sample.

The differentiator 21 includes a delay block 21a designed to receive at input, at the i-th instant, the sample $S_F(i)$ of the filtered signal $S_F$ and to supply at output, at the i-th instant, a delayed sample $S_F(i-1)$ of the filtered signal $S_F$. The differentiator 21 moreover includes an adder 21b, configured for receiving at input, at the i-th instant, the sample $S_F(i)$ and the delayed sample $S_F(i-1)$ and generating at output a difference sample $S_D(i)=S_F(i)-S_F(i-1)$. The differentiator 21 moreover includes a multiplier 21c, configured for carrying out an operation of multiplication of the difference sample $S_D(i)$ for $1/\Delta T$, where $\Delta T$ is the sampling time (i.e., the clock period) previously identified; there is thus generated at output the sample $S_{TS}(i)$. The signal $S_{TS}$ represents an equivalent angular velocity obtained as derivative (executed digitally) of the equivalent angle generated at output by the filter 16.

The sample $S_{TS}(i)$ and the sample $S_{out}(i)$ are supplied at input to the adder 23, which generates at output, at the i-th instant, the intermediate signal $S_{int}(i)=S_{out}(i)-S_{TS}(i)$. The intermediate signal $S_{int}(i)$ is hence a signal that represents the deviation, sample by sample, between the samples $S_{out}(i)$ of the signal $S_{out}$ (affected by the drift error) and the samples $S_{int}(i)$ of the intermediate signal $S_{int}$ (not affected by the drift error).

Then, the intermediate signal $S_{int}$ is supplied at input to the processing logic 25, which, on the basis of the current value of the intermediate signal $S_{int}$, generates at output the offset signal $S_{OFF}$. As illustrated with reference to FIG. 3, by subtracting (sample by sample using the adder 20) the offset signal $S_{OFF}$ from the signal $S_{out}$, the error component that afflicts the signal $S_{out}$ is minimized. Since this process is carried out continuously during the entire service life of the gyroscope 3, a variation of the drift of the signal $S_{out}$ is compensated for by a corresponding variation of the offset signal $S_{OFF}$.

With reference to FIG. 5, a method for calculating the offset signal $S_{OFF}$ according to one embodiment of the present disclosure is illustrated, by means of a flowchart.

The method of FIG. 5 starts from an assumption, expressed by the following formula (4):

$$AVG(S_{out}-S_{TS})=AVG(S_{int}-\Omega_C)=AVG(S_{int})-AVG(\Omega_C) \\ S_{int}(t) \quad (4)$$

where AVG is the mathematical operation of arithmetical average.

According to formula (4), the average of the difference between the signals $S_{out}$ and $S_{TS}$, obtained as described previously, is equal to the average of the intermediate signal $S_{int}$ (which, as has been said, represents the error or drift that afflicts the signal $S_{out}$) minus the term $\Omega_C$, which takes into account the fact that the signal $S_{TS}$ has been calculated using the measurements coming from the gyroscope and/or from the accelerometer, which refer to reference systems different from one another and comparable only by introducing a compensation factor (herein, the term $\Omega_C$). The present applicant has found that the average of the term $\Omega_C$, calculated over a sufficiently wide time window, is substantially equal to zero. Hence, the approximation expressed by formula (4) is, in practice, acceptable, and the average of the signal $S_{int}$, calculated on appropriate time windows, follows the variation over time of the drift that afflicts the signal of the gyroscope (here represented by the signal $S_{int}(t)$).

Figure 6:
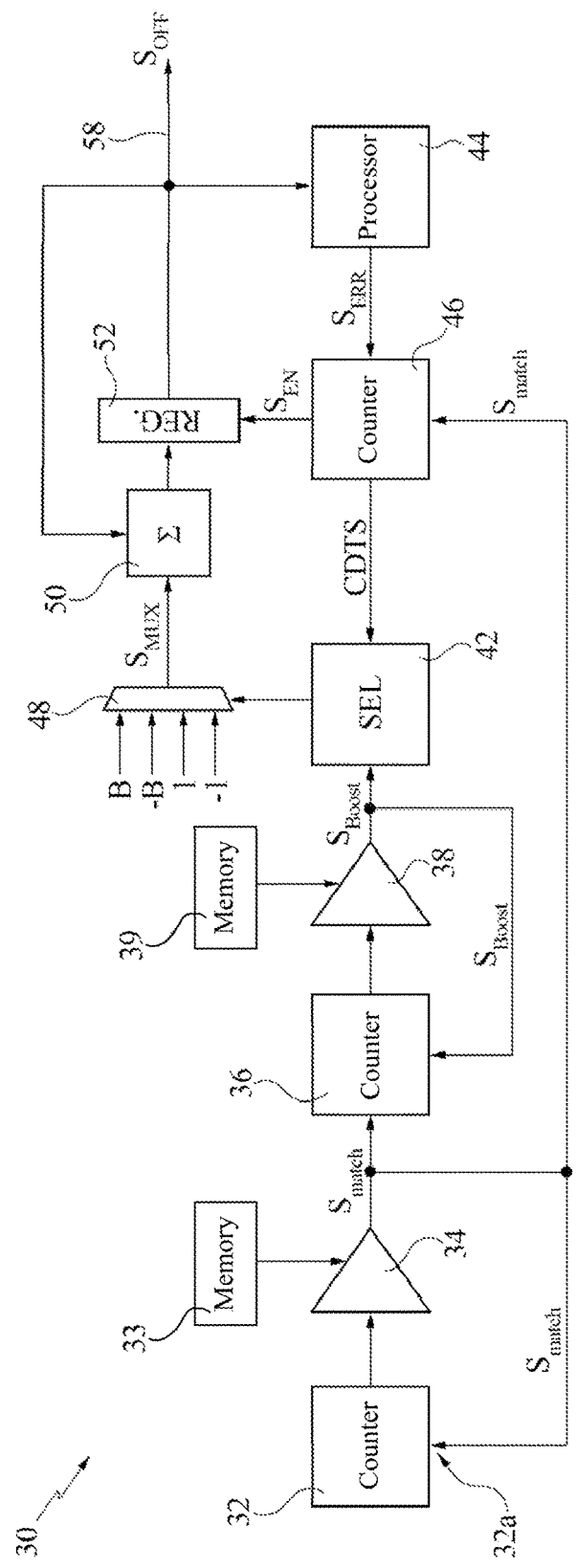
FIG. 6 shows a hardware embodiment of the method of FIG. 5, according to the present disclosure.

With reference to FIGS. 5 and 6, the following variables are used:

OFF: this is a numerical variable that represents the current offset value and also takes into account the fact that the signals $S_{out}$ and $S_{TS}$ refer to reference systems that are not comparable to one another;

ERR: this is a numerical variable that represents the current error (or drift) (referred to the i-th sample), calculated as $ERR(i)=S_{out}(i)-S_{TS}(i)-OFF(i-1)$; it is here pointed out that the method described in what follows is to send the variable ERR to zero; in fact, the condition $ERR(i)=0$ ensures that effectively the offset produced at the i-th instant by the calibration circuit according to the present disclosure is sufficient to balance the offset (or drift) that the gyroscope presents at the same i-th instant;

WIN: this is a predefined numerical variable that identifies the length (defined as number of clock cycles) of the time window in which to calculate the current offset and is chosen with a value such as to satisfy formula (4), i.e., in such a way that the average of the factor $\Omega_C$ in the time window WIN is approximately zero; the larger the time window WIN, the closer the aforesaid average will be to zero; from another standpoint, the variable WIN establishes a compromise between noise and rate of convergence of the calibration method towards the true offset value;

CNT: this is a counter variable that has the purpose of identifying the fact that the value set for the time window WIN has been reached;

CDTS: this is a counter variable that identifies whether, in the time window WIN, the variable ERR has assumed a positive value or a negative value a greater number of times, or whether the number of times is equal;

BT: this is a predefined numerical variable that identifies a time window during which the offset-calculation block 18 is in an initialization step;

$T_A$: this is a counter variable that has the purpose of identifying the fact that the value set for the time window BT has been reached.

With reference to step S1 of FIG. 5, the variables CNT, CDTS, $T_A$, and OFF are initialized at a predefined value, in particular zero. The time windows WIN and BT are initialized at the respective predefined values, chosen according to the operation of the device. With reference to WIN, a compromise should be sought between a sufficient amplitude of the window considered, so as to render the average of $\Omega_C$ approximately zero, and the processing rate, in so far as before the end of WIN the current offset value (variable OFF) is not updated. For instance, WIN has a value equal to a power of 2 (greater than 1), in particular comprised between 64 and 512, for example, 128 or 256.

With reference to BT, during this time window the calculation of the current offset is made in an approximate way so as to enable a fast convergence around the "true" value at the expense of precision; this is useful only in the starting step of the method of FIG. 5, when the system converges rapidly around the current offset value.

Then (step S2), the value of the variable ERR is calculated using the samples available at the i-th instant, i.e., according to the formula identified previously, given by $$ERR(i)=S_{out}(i)-S_{TS}(i)-OFF(i-1) \quad (5)$$

At the initial instant, when i=0, the value of OFF(i−1) is the initialization value of OFF, for example, zero.

Then the counter CNT is incremented by one.

Next (step S3), a check is made to verify whether the current value of ERR (i.e., ERR(i) calculated in step S2) is greater or less than zero. In the case where ERR(i)>0, then control passes to step S4, where the counter CDTS is incremented by one; instead, in the case where ERR(i)<0, control passes to step S5, where the counter CDTS is decremented by one.

This is followed by a step S6 of wait for one clock cycle. The offset-calculation block 18 operates synchronously with the gyroscope and the accelerometer, and the waiting step S6 enables acquisition of new samples $S_{out}(i+1)$ and $S_{TS}(i+1)$ for the subsequent calculation of the offset ERR(i+1), as represented more fully hereinafter.

Then (step S7), a check is made to verify whether the end of the window WIN has been reached by comparing the current value of the counter CNT with the value of WIN.

If it has not (output "NO" from step S7), control returns to step S2, and the error ERR(i+1) is calculated on the basis of the samples acquired at the new clock cycle.

If it has (output "YES" from step S7), control passes to step S8, where the counter CNT is reset (in particular, CNT=0) and, in step S9, a check is made to verify whether the variable $T_A$ has reached the value set by BT. Following upon this check, the variable $T_A$ is incremented by one. It is evident that, according to a different embodiment, the variable $T_A$ may be incremented before the check.

In the case where the check of step S9 returns a result such that $T_A \leq BT$, then (output "YES" from step S9), the value assumed by the variable CDTS is evaluated during the previous iterations of steps S2-S7, in particular during step S4 or S5. This operation is carried out in step S10.

With reference to step S10, if the variable CDTS is greater than zero, this means that step S4 has been carried out a greater number of times than step S5 in the time window WIN, i.e., that the error ERR has prevalently been greater than zero. Hence, the variable OFF should be incremented by a predetermined amount B so as to get the value of OFF to converge towards a value that minimizes the value of ERR.

If the variable CDTS is less than zero, this means that step S5 has been carried out a greater number of times than step S4 in the time window WIN, i.e., that the error ERR has prevalently been less than zero. In this case, the variable OFF should be decremented by the predetermined amount B, with the same purpose of getting the value of OFF to converge towards a value that minimizes the value of ERR.

The value of B is chosen according to the operation, in particular greater than 1 (e.g., 8 or 16 or 32).

In the case where the variable CDTS is equal to zero, it is not necessary to modify the current value of OFF.

Once again with reference to step S10, the value of the variable CDTS is not reset to zero but is set to CDTS/2 so as to keep track of the previous state. It is evident that the choice of the value CDTS/2 is arbitrary, and the variable CDTS may be set, in step S10, to a value different from CDTS/2, either greater or smaller.

Control then returns to step S2.

With reference once again to step S9, in the case where the check returns a result identifying the fact that the variable $T_A$ has exceeded the value of BT ($T_A>BT$), then (output "NO" from step S9) control passes to step S11, where the value assumed by the variable CDTS during the previous iterations of steps S2-S7 is evaluated, in particular during step S4 or S5. This operation is similar to that of step S10.

However, with reference to step S11, if the variable CDTS is greater than zero, the variable OFF is incremented by one so as to obtain a slower but more precise convergence of the value of the variable OFF towards a value that minimizes the value of ERR. To clarify this aspect better, it is pointed out that, at the end of a window WIN, the average of $\Omega_C$ might not be zero. In this case, the variable CDTS would be affected by a noise, which is in turn introduced by ERR. This noise tends in any case to compensate over time. In other words, a possible erroneous increment/decrement of the variable OFF is compensated for by a subsequent update of the same variable OFF with sign opposite to the previous erroneous increment/decrement. However, if OFF is incremented/decremented by (non-unit) steps B, it may happen that the above noise leads to a significant divergence of OFF with respect to the ideal value that would guarantee full compensation. In this sense, incrementing/decrementing by one the variable OFF enables a more precise convergence to be obtained.

If the variable CDTS is less than zero, then the variable OFF is decremented by one, with the same purpose of getting the value of OFF to converge towards a value that minimizes the value of ERR.

In the case where the variable CDTS is zero, it is not necessary to modify the current value of OFF.

Once again with reference to step S11, the value of the variable CDTS is set to CDTS/2, so as to keep track of the previous state. Also in this case, as described with reference to step S10, the choice of the value CDTS/2 is arbitrary, and the variable CDTS may be set to a value different from CDTS/2, either greater or smaller.

Control then returns to step S2.

The present applicant has found that the method of steps S2-S11 enables minimization of the variable ERR even when the value of drift that afflicts the measurements of the gyroscope varies over time in so far as steps S10 and S11 enable the variations of drift in time to be tracked.

FIG. 6 shows, by means of a block diagram, an embodiment of a compensation circuit 30 designed to implement the steps of method of FIG. 5, for compensating the error introduced by the drift on the measurements of the gyroscope.

The compensation circuit 30 comprises a counter block 32, configured for storing, incrementing, and resetting the counter variable CNT. The variable WIN is instead stored in a memory or register 33.

Advantageously, the memory or register 33 is of a rewritable type, so that the value set for WIN is modifiable and updatable any number of times, according to the operation. The compensation circuit 30 further comprises a comparator 34, operatively coupled to the counter block 32 and to the register 33, for receiving the respective values of CNT and WIN and for making a comparison between CNT and WIN, implementing step S7. The output of the comparator 34 is a signal $S_{match}$ indicating a result of the comparison. The signal $S_{match}$ is fed back to the counter block 32 (input 32a). The counter block 32 is configured in red such a way that, if $S_{match}$ identifies CNT=WIN, the value CNT is reset to zero; instead, if $S_{match}$ identifies CNT≠WIN, in particular CNT<WIN, then the value CNT is not modified. The signal $S_{match}$ is, for example, a binary signal, which may assume alternatively the high logic value "1" when CNT=WIN and the low logic value "0" when CNT<WIN.

The signal $S_{match}$ is sent at input to a further counter block 36, which stores the current value of the variable $T_A$. The signal $S_{match}$ controls the increment of the value of $T_A$. In particular, when $S_{match}$ identifies the condition CNT=WIN (e.g., $S_{match}$="1"), the variable $T_A$ is incremented; instead, when $S_{match}$ identifies the condition CNT<WIN (e.g., $S_{match}$="0"), the variable $T_A$ is not incremented. The output of the counter block 36 is the value of the variable $T_A$ and is sent at input to a comparator 38. The comparator 38 moreover receives at input the value BT, stored in a rewritable memory or register 39 so as to be updatable/modifiable according to the operation. The comparator 38, together with the counter 36, implements step S9 of FIG. 5, and generates at output a comparison signal $S_{boost}$ identifying a result of the comparison.

In order to reduce the complexity of the circuit described above, it is possible to use the counter 36 as counter of windows WIN and express the boost time BT as number of windows WIN. In this case, the signal $T_A$ produced by the counter 36 is a time expressed in number of windows WIN, BT is the boost time expressed in number of windows WIN, and the counter 36 is incremented whenever $S_{match}$=1 and when the system is operating in boost mode ($S_{boost}$=1).

The comparison signal $S_{boost}$ is, for example, a binary signal, which may assume a high logic value "1" when $T_A \leq BT$ and a low logic value "0" when $T_A > BT$. The comparison signal $S_{boost}$ is fed back to an enable input of the counter 36, thus controlling operation thereof. In particular, when $S_{boost}$="1", the counter 36 operates as described previously. Instead, when $S_{boost}$="0", the counter 36 is disabled, and the signal $T_A$ supplied at output is a predefined signal such as to satisfy the condition $T_A > BT$.

The signal $S_{boost}$ is moreover supplied at input to a selector block 42. The selector block 42 moreover receives at input from a counter 46 a signal identifying the value of the variable CDTS.

The variable CDTS is incremented or decremented by the counter 46 according to what has been described with reference to steps S2-S5 of FIG. 5. In particular, the variable CDTS is incremented if the error represented by the variable ERR is greater than zero, and decremented if the error represented by the variable ERR is less than zero. Calculation of the variable ERR, according to Eq. (5), is carried out by a processing logic 44, which also makes a comparison between the result obtained and zero, supplying at output a signal $S_{ERR}$ identifying a result of the operation according in step S3 of FIG. 5. The signal $S_{ERR}$ is supplied to a counter 46, which performs the operations of increment/decrement of the variable CDTS according to steps S4 and S5 of FIG. 5.

The value of CDTS is supplied by the counter 46 to the selector block 42. The selector block 42 controls a multiplexer 48 in such a way that the output $S_{MUX}$ of the multiplexer 48 is one of the values B, −B, 1, −1 used for incrementing/decrementing the variable OFF according to steps S10 and S11 of FIG. 5.

The selector block 42 controls the multiplexer 48 according to the following truth table:

| $S_{boost}$ | CDTS | $S_{MUX}$ |
|---|---|---|
| 1 | >0 | B |
| 1 | <0 | −B |
| 0 | >0 | 1 |
| 0 | <0 | −1 |
| 1/0 | 0 | 0 |

The output $S_{MUX}$ of the multiplexer 48 is supplied to an adder 50. The adder 50 moreover receives at input the signal OFF so as to yield at output the signal OFF+$S_{MUX}$, where $S_{MUX}$ assumes one of the values given in the table above, thus implementing the operations of steps S10 and S11 (alternative to one another).

The output of the adder 50 is supplied at input to a register 52, which stores the current value of OFF+$S_{MUX}$, thus implementing the operation OFF=OFF+$S_{MUX}$. The value of OFF is thus constantly updated at each iteration of the method of FIG. 5. The register 52 is made up, for example, of flip-flops.

As may be noted, the signal $S_{match}$ generated by the comparator 34 is also supplied at input to the counter 46. In detail, a value of $S_{match}$ identifying the condition CNT=WIN (e.g., $S_{match}$="1") causes reset of the variable CDTS and sending of an enable signal $S_{EN}$ to the register 52 by the counter 46. Reset of the variable CDTS corresponds, in particular, to setting the variable CDTS to the value CDTS/2. Sending of the enable signal $S_{EN}$ to the register 52 causes, instead, supply, on the output 58, of the value of OFF currently stored by the register 52.

Figure 7:
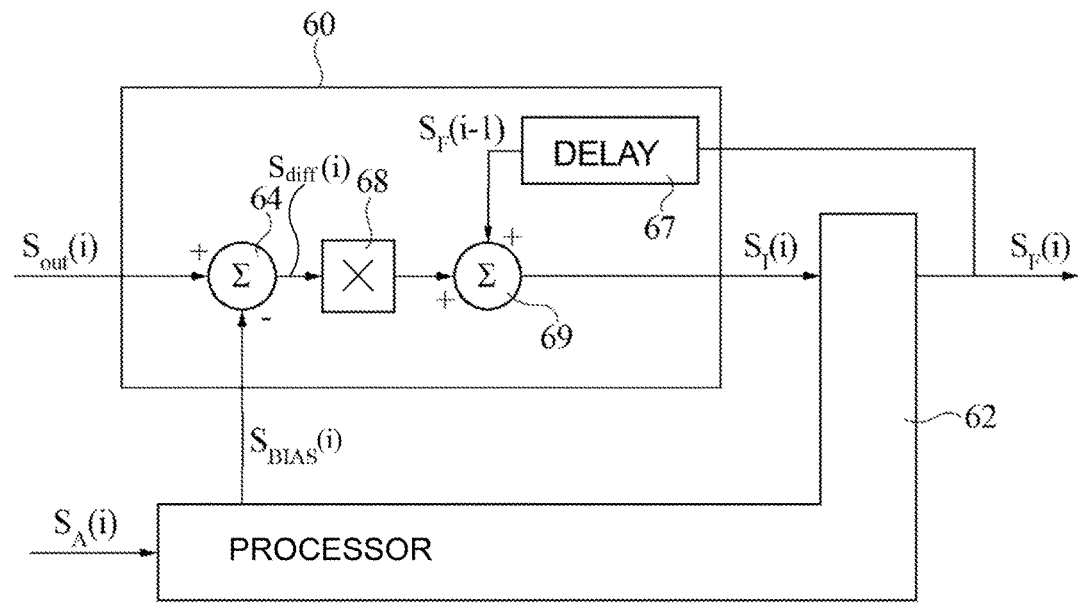
FIG. 7 is a block diagram of an embodiment of a filter designed to be integrated in the calibration system of FIG. 3.

With reference to FIG. 7, an embodiment of the filter 16 of FIG. 2, in particular a filter based upon the Kalman algorithm is shown.

The filter 16, according to the embodiment of FIG. 7, includes an integrator 60 and a processing block 62 configured for implementing a filtering based upon the Kalman algorithm. The integrator 60 receives at input the signal $S_{out}$ generated by the gyroscope and produces at output a signal $S_I$ that is the integral of the signal $S_{out}$.

Since, as has been said, the signal $S_{out}$ is a digital signal, in what follows the term $S_{out}(i)$ will be used, where i is the i-th sample generated at the i-th clock cycle. The integrator 60 operates on samples and is consequently obtained, in a way in itself known, by an adder with feedback. On the basis of the signal $S_{out}(i)$, the integrator 60 generates at output the signal $S_I(i)$, which is supplied at input to the processing block 62. The signal $S_I(i)$ represents a measurement of angle (generated on the basis of the velocity of rotation of the mobile mass of the gyroscope).

The processing block 62 moreover receives at input the signal $S_A(i)$, supplied by the accelerometer, and generates at output a corrective signal $S_{BIAS}$(i-th sample $S_{BIAS}(i)$).

With reference to FIG. 7, the integrator 60 is the hardware implementation of Eq. (3), and includes an adder 64, designed to receive the samples $S_{out}(i)$ and the samples $S_{BIAS}(i)$ and generate at output the difference sample $S_{diff}(i)$ given by $S_{out}(i) - S_{BIAS}(i)$. This difference sample $S_{diff}(i)$ is then supplied at input to a multiplier 68, which makes a multiplication by $\Delta T$, which generates at output the multiplied signal $S_{diff}(i) \cdot \Delta T$. Then, the signal thus generated is supplied at input to an adder 69. The adder 69 moreover receives at input the samples $S_F(i)$ generated at output by the filter 16 (feedback), delayed (delay block 67) so as to be synchronous with the clock signal. The sum of a current sample (i-th sample) with the sample at the preceding instant ((i−1)-th sample) is hence obtained, thus performing the operation of integration.

The Kalman filter is a filter of a known, recursive, type, which evaluates the state of a dynamic system starting from a series of measurements subject to noise.

Considering the application to the inertial-measurement system 2 comprising the gyroscope 3 and the acceleration sensor 4, the characteristic equations of said Kalman filter are $$S_F(i) = S_I(i) + K_0 \cdot y(i) \quad (6)$$

$$S_{BIAS}(i) = S_{BIAS}(i-1) + K_1 \cdot y(i) \quad (7)$$

where $S_F(i)$ is the signal at output from the filter 16 (filtered angle), $S_I(i)$ is the signal at output from the integrator (non-filtered angle), $S_{BIAS}(i)$ is a corrective factor to be applied to the measurements of angular velocity (signal $S_{out}(i)$) supplied by the gyroscope, $K_0$ is a first gain value, $K_1$ is a second gain value, and y(i) is an innovation factor (known as "Kalman innovation factor").

The covariance matrix P is then defined as follows:

$$P = \begin{bmatrix} P_{00} & P_{01} \\ P_{10} & P_{11} \end{bmatrix} \quad (8)$$

The innovation factor y(i) is given by $$y(i)=S_A(i)-S_I(i) \quad (9)$$

The first gain value $K_0$ and the second gain value $K_1$ are given by $$K_0=P_{00}/R \quad (10a)$$

$$K_1=P_{10}/R \quad (10b)$$

where $R=P_{00}+R_{COV}$, and $R_{COV}$ is the value of process-noise covariance measured. The present applicant has found that the value of $R_{COV}$ is in the region of 0.03. This value may, however, vary from one device to another.

At each iteration, the values of the matrix P are updated according to the following equations (at the first iteration the values of the matrix P at the previous clock cycle, i−1, are equal to 0):

$$P_{00}(i)=P_{00}(i-1)-\Delta T \cdot [P_{10}(i-1)+P_{01}(i-1)]+Q_a \cdot \Delta T - K_0 \cdot P_{00}(i-1)$$

$$P_{01}(i)=P_{01}(i-1)-P_{11}(i-1) \cdot \Delta T - K_0 \cdot P_{01}(i-1)$$

$$P_{10}(i)=P_{10}(i-1)-P_{11}(i-1) \cdot \Delta T - K_1 \cdot P_{00}(i-1)$$

$$P_{11}(i)=P_{11}(i-1)+Q_g \cdot \Delta T - K_1 \cdot P_{01}(i-1)$$

where $\Delta T$ is the sampling time (i.e., the time between successive clock cycles, given that the system is synchronous), and $Q_a$ and $Q_g$ are values deriving from the process-noise covariance matrix. The present applicant has found that, according to one embodiment, the values of $Q_a$ and $Q_g$ are, respectively, approximately 0.001 and 0.003.

The values of $Q_a$ and $Q_g$ depend upon the particular sensor and may be established by making measurements on the device.

It is here pointed out that the calculation or measurement of the parameters of the Kalman filter (matrix P, noise covariance $R_{COV}$, values of $Q_a$ and $Q_g$) may be made according to methods known in the literature. See, for example, the article by Greg Welch and Gary Bishop, "An Introduction to the Kalman Filter", Department of Computer Science, University of North Carolina at Chapel Hill, Chapel Hill, N.C. 27599-3175, 2006, where a method of tuning of a Kalman filter of a known type is discussed.

On the basis of the foregoing equations, the calculation of the values of $K_0=P_{00}/R$ and $K_1=P_{10}/R$ according to the known methods use large computational resources in so far as it is made iteratively on the basis of the values of the matrix P.

The present applicant has found, via simulations, that the values $K_0$ and $K_1$, after a period of transient, tend to settle on a stable asymptotic value. It is thus possible to calculate beforehand the asymptotic values of $K_0$ and $K_1$ and store them in appropriate registers or memories so as to simplify considerably the hardware resources used for implementation of Kalman equations.

Hence, it is possible to carry out a hardware implementation of Eqs. (6) and (7) without calculating the values of the matrix P, which, according to the present disclosure, is not used.

The present applicant has found that, according to one embodiment, the asymptotic values of $K_0$ and $K_1$ are given by $K_0 \approx 0.026$ and $K_1 \approx -0.05$.

The values of $K_0$ and $K_1$ can be calculated case by case with experimental tests, in a way in itself known.

It follows that Eqs. (6) and (7) become $$S_F(i)=S_I(i)+0.026 \cdot y(i), \text{ in the case in point} \quad (11)$$

$$S_{BIAS}(i)=S_{BIAS}(i-1)-0.05 \cdot y(i), \text{ in the case in point} \quad (12)$$

Figure 8:
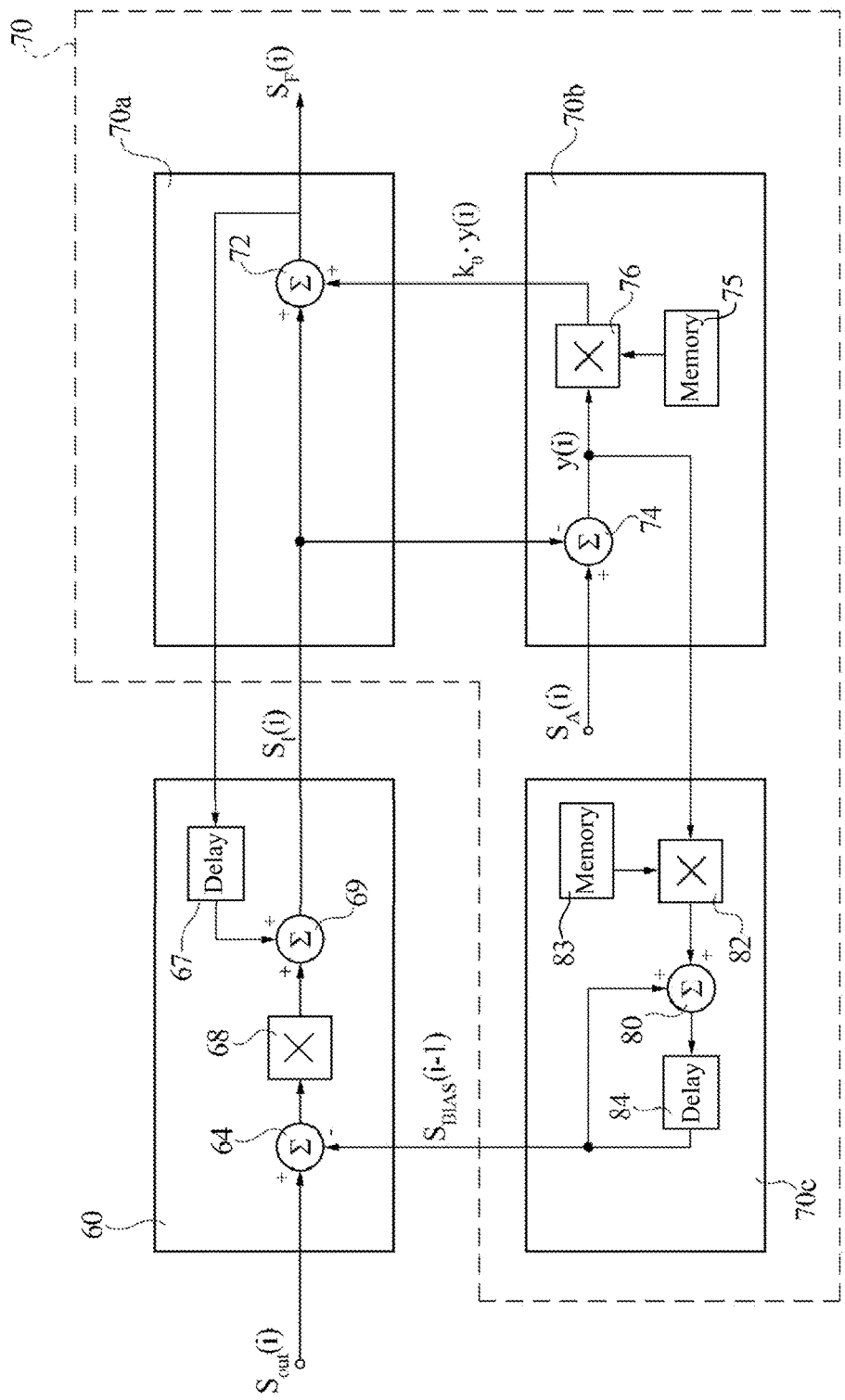
FIG. 8 shows a hardware implementation of the filter of FIG. 7, according to one embodiment of the present disclosure.

FIG. 8 shows a block circuit that performs hardware implementation of the aforementioned Eqs. (11) and (12), according to one aspect of the present disclosure.

In detail, FIG. 8 shows a filtering circuit, designated as a whole by the reference number 70, which includes three sub-blocks 70a-70c, each of which is designed to implement a function of its own and is operatively coupled to the other sub-blocks and to the integrator 60 already shown and described with reference to FIG. 7.

The sub-block 70a basically comprises an adder 72, and is configured for implementing the operation of addition of the terms of Eq. (11), generating on an output of its own, at each clock cycle, a sample $S_F(i)$ of the filtered signal $S_F$.

The sub-block 70b implements the operation according to Eq. (9) for calculation of the innovation factor y(i). For this purpose, the sub-block 70b comprises an adder 74, which receives at input the samples $S_A(i)$ of the signal $S_A$ (from the accelerometer) and the samples $S_I(i)$ generated at output by the integrator 60 and generates the samples $y(i)=S_A(i)-S_I(i)$. The sub-block 70b further comprises a multiplier 76, for carrying out the operation of multiplication between the fixed value of $K_0$ and the value of the current sample of y(i), which are both sent at input to the multiplier 76. The value of $K_0$ is stored in a memory or register 75 integrated in the circuit of FIG. 8 or external thereto. In particular, the memory or register 75 that stores the value of $K_0$ is of a re-writable type so that it can be updated in the case where it is desired to modify the value of $K_0$.

The sub-block 70b generates at output, at the i-th clock cycle, a value that is equal to $K_0 \cdot y(i)$ (i.e., the second term of Eq. (11)), which is supplied at input to the adder 72 of the sub-block 70a.

In this way, the adder 72 can generate at output the value of $S_F(i)$ according to Eq. (11).

The sub-block 70c is configured for implementing Eq. (12). For this purpose, the sub-block 70c includes an adder 80, designed to implement the operation of addition between the two terms of Eq. (12), and a multiplier 82 designed to implement the operation of multiplication of the value of y(i), as calculated by the sub-block 70b, and $K_1$. The value of $K_1$ is stored in a memory or register 83 integrated in the circuit of FIG. 8 or external thereto. In particular, the memory or register 83 that stores the value of $K_1$ is of a re-writable type so that it can be updated in the case where it were desired to modify the value of $K_1$. The output of the multiplier 82 is sent at input to the adder 80.

The first term of Eq. (12) is the value of $S_{BIAS}$ at the iteration (or clock cycle) previous to the current one, i.e., at the (i−1)-th clock cycle. For this purpose, the sub-block 70c moreover includes a delayer element 84 coupled to the output of the adder 80, designed to introduce a delay equal to one clock cycle to the sample generated at output by the adder 80.

The output of the delayer 84 at the i-th clock cycle is hence the output of the adder 80 at the (i−1)-th clock cycle, and is supplied at input to the adder 80 so as to implement the operation of addition of Eq. (12).

The output of the delayer 84 moreover constitutes the value of the sample $S_{BIAS}(i-1)$, which is supplied at input to the adder 64 of the integrator 60. The value of $S_{BIAS}$ supplied to the integrator 60 at the i-th cycle is $S_{BIAS}(i-1)$, i.e., the one obtained at the (i−1)-th cycle. This additional delay does not introduce significant functional differences and is result in order to render the block diagram of FIG. 8 implementable through the use of standard logic circuits (i.e., without resorting to combinational loops).

The filter 16 of FIG. 3 is thus obtained, according to one aspect of the present disclosure.

To reduce further the complexity of production of the filter 16, it is possible to minimize the number of bits on which the values of the innovation-factor samples y(i) and the values of the corrective factor $S_{BIAS}(i)$ are represented.

The present applicant has found that the value y(i) never falls outside, or rarely falls outside, of the interval [−210, 210−1]. Consequently, the value of y(i) can be represented by variables of an integer type on a number of bits not higher than 11.

The present applicant has moreover found that the value $S_{BIAS}(i)$ never falls outside, or rarely falls outside, of the interval [−25, 25−1]. Consequently, the value of $S_{BIAS}(i)$ can be represented by variables of an integer type on a number of bits not higher than 6.

In order to optimize further the filter 16 from the standpoint of reduction of complexity and increase in processing rate, it is moreover possible to carry out an approximation on the digital values received at input to the filter 16.

The values $S_{out}(i)$ and $S_A(i)$ are typically represented by means of floating-point numbers or fixed-point numbers. This representation, however, uses a greater processing capacity and complexity as compared to integers. It is hence possible, as illustrated schematically in FIG. 9, to carry out an approximation by multiplying the values of $S_{out}(i)$ and $S_A(i)$ at input to the filter 16 by a value N that is a power of 2 so as to carry out a conversion (with a possible negligible loss of precision) from values with decimal point to integer values. This operation is carried out by means of multipliers by N 91 and 92, coupled to respective inputs of the filter 16. The error introduced by the use of integers when N is greater than 2 is negligible.

For instance, with N=2 or N=4 the error introduced is negligible as compared to other sources of error due to data processing.

Once again with reference to FIG. 9, moreover present is a divider by N 93 coupled to the output of the filter 16 so as to represent the samples $S_F(i)$ on an adequate number of bits. The divider 93 may be implemented as multiplier by 1/N, thus reducing the complexity of implementation thereof.

The operations of multiplication by N on the inputs and of division by N on the output can be obtained in an extremely simple way if N is a power of 2. In this case, the multiplication may be obtained by adding least-significant bits (LSBs) with value 0, and the division may be obtained by removing the least-significant bits (i.e., removing the LSBs added on the inputs).

Figure 10:
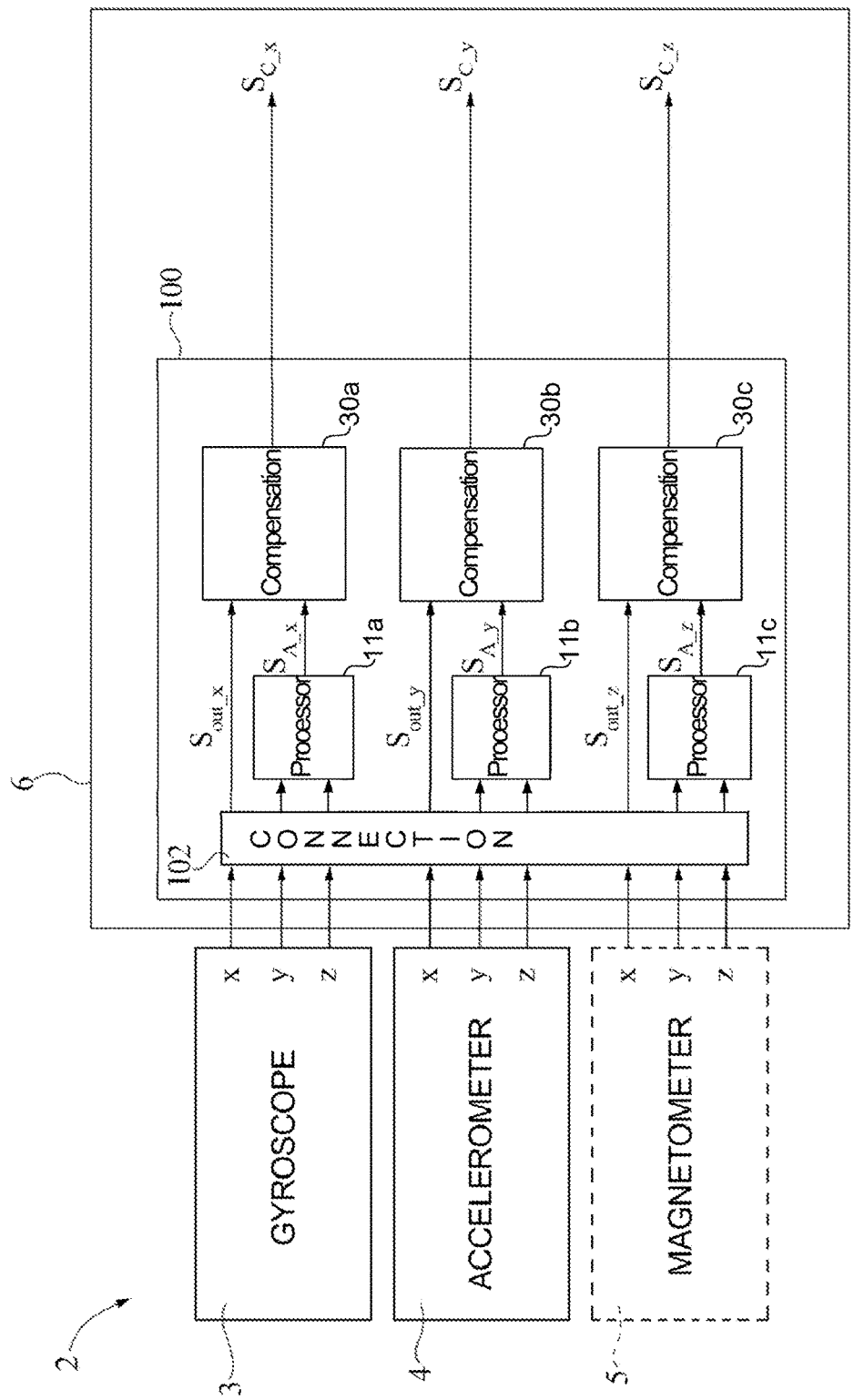
FIG. 10 shows an electronic device including the inertial-measurement system of FIG. 1 and the calibration system of FIG. 3, operatively coupled to one another.

FIG. 10 shows an electronic device, in particular of a portable type, including the inertial-measurement system 2 of FIG. 1 and a sensor processing element 100, in turn including a plurality of compensation circuits 30a-30c of the type shown in FIG. 3 and configured for implementing the method of FIG. 5. It is evident that the method of FIG. 5 can be implemented via a software program; in this case, the blocks 30a-30c of FIG. 10 may be replaced by one or more microprocessors, which are designed for executing a code that implements the method of FIG. 5.

The sensor processing element 100 is, according to one embodiment, integrated in the ASIC 6.

The sensor processing element 100 moreover includes a connection block 102, operatively coupled to the gyroscope 4, for connection to the accelerometer 4 and to the magnetometer 5, so as to receive at input the signals generated thereby. In detail, the gyroscope generates angular-velocity signals for each sensing axis (here, three axes), in its own reference system, the accelerometer generates acceleration signals for each sensing axis (here, three axes), in its own reference system, and the magnetometer generates signals of magnetic-field intensity for each sensing axis (here, three axes x, y, z), in its own reference system.

The connection block 102 has the function of receiving the aforementioned signals and supplying to each compensation circuit 30a-30c a respective signal correlated to just one of the sensing axes.

Hence, the compensation circuit 30a receives at input the angular-velocity signal detected by the gyroscope 3 for the axis x (in the figure referred to as "signal $S_{out\_x}$"), and the signal $S_{A\_x}$ of equivalent angle of rotation A_eq_x about the axis x calculated by the processing block 11a on the basis of the measurements of the accelerometer 4, as described previously with reference to the processing block 11 of FIG. 3.

In fact, the processing block 11a receives from the connection block 102 the values of acceleration along y and z, supplied by the accelerometer 4 and supplies at output the signal $S_{A\_x}$=A_eq_x.

Likewise, the compensation circuit 30b receives at input the signal of angular velocity detected by the gyroscope 3 for the axis y (in the figure referred to as "signal $S_{out\_y}$") and the signal $S_{A\_y}$ of equivalent angle of rotation A_eq_y about the axis y calculated by the processing block 11b on the basis of the measurements of the accelerometer 4, as described previously with reference to the processing block 11 of FIG. 3.

In fact, the processing block 11b receives from the connection block 102 the values of acceleration along x and z, supplied by the accelerometer 4 and supplies at output the signal $S_{A\_y}$=A_eq_y.

Likewise, the compensation circuit 30c receives at input the signal of angular velocity detected by the gyroscope 3 for the axis z (in the figure referred to as "signal $S_{out\_z}$"), and the signal $S_{A\_z}$ of equivalent angle of rotation A_eq_z about the axis z calculated by the processing block 11c on the basis of the measurements of the accelerometer 4, as described previously with reference to the processing block 11 of FIG. 3.

In fact, the processing block 11c receives from the connection block 102 the values of acceleration supplied by the accelerometer 4 and of magnetic field supplied by the magnetometer 5, and supplies at output the signal $S_{A\_z}$=A_eq_z.

The output signals from the compensation circuits 30a-30c are, respectively, the signals $S_{C\_x}$, $S_{C\_y}$ and $S_{C\_z}$, each of which is correlated, respectively, to the signal $S_{out\_x}$, $S_{out\_y}$ and $S_{out\_z}$, and where the error component caused by the drift time of the signal of the gyroscope 3 is compensated.

The advantages of the disclosure according to the present disclosure, and of the corresponding manufacturing method, emerge clearly from the foregoing description.

In particular, the present disclosure enables an "on-chip" correction of the drift that afflicts the signal of the gyroscope in a fast and inexpensive way, in particular integrating a low-cost hardware engine directly within the ASIC.

The method according to FIG. 5 uses low computational capacity and involves a low hardware cost. Furthermore, since said method is carried out continuously, irrespective of the state of the electronic device that houses the gyroscope/accelerometer/magnetometer (i.e., irrespective of whether said device is moving or stationary), compensation of the drift is obtained in real time, always guaranteeing good results of measurement by the gyroscope.

Finally, it is clear that modifications and variations may be made to what has been described and illustrated herein, without thereby departing from the sphere of protection of the present disclosure.

Figure 9:
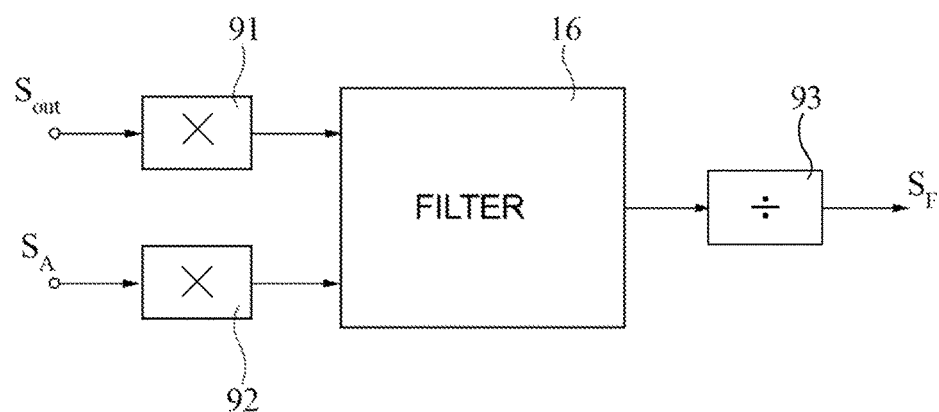
FIG. 9 shows the filter of FIG. 7 or FIG. 8 according to a further aspect of the present disclosure.

For instance, the filter 16 according to the embodiment of FIGS. 7-9 may be used independently of the context of application of FIG. 3.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    calibrating in real-time a gyroscope that is configured to supply an angular velocity that is a function of a first rotation angle about a first angular-sensing axis, the calibrating including:
        defining a discrete time interval including a plurality of temporal sub-units;
        acquiring from an accelerometer, in a first temporal sub-unit of the plurality of temporal sub-units, respective values of acceleration along a first acceleration-sensing axis and a second acceleration-sensing axis of the accelerometer;
        calculating, in said first temporal sub-unit, based on said acceleration values, an equivalent angular velocity corresponding to said first rotation angle;
        calculating, in said first temporal sub-unit, a deviation between the angular velocity and said equivalent angular velocity;
        updating a counter variable based on the deviation;
        iteratively repeating the defining, the acquiring, the calculating the equivalent angular velocity, the calculating the deviation, and the updating of the counter variable for temporal sub-units of the plurality of temporal sub-units subsequent to the first temporal sub-unit up to the end of said time interval;
        incrementing or decrementing an offset variable by a first value based on the counter variable; and
        updating said angular velocity as a function of said offset variable.

2. The method according to claim 1 wherein the updating the angular velocity includes carrying out an algebraic addition between the angular velocity and the offset variable.

3. The method according to claim 1 wherein the calculating the equivalent angular velocity includes calculating a time derivative of an arctangent of a ratio between the acceleration along the first acceleration-sensing axis of the accelerometer and the acceleration along the second acceleration-sensing axis of the accelerometer.

4. The method according to claim 1 wherein the time interval has a value that is a power of 2, greater than 1.

5. The method according to claim 1 wherein the calculating the deviation includes: incrementing said counter variable by a second value if said deviation is greater than zero;
    decrementing said counter variable by the second value if said deviation is less than zero; and
    wherein the updating of the counter variable includes incrementing the offset variable if said counter variable is greater than zero and decrementing the offset variable if said counter variable is less than zero.

6. The method according to claim 1, further comprising verifying whether the calibrating is in an initial step and, if so, incrementing or decrementing the offset variable by a third value, the third value being greater than the first value.

7. The method according to claim 1, further comprising filtering, with a low-pass filter, said equivalent angular velocity to obtain an equivalent filtered angular velocity.

8. The method according to claim 1, further comprising filtering, with a filter based upon Kalman filtering, the angular velocity generated by the gyroscope and the equivalent angular velocity to obtain an equivalent filtered angular velocity and to implement the equations:

$$S_F(i)=S_I(i)+K_0 \cdot y(i)$$

$$S_{BIAS}(i)=S_{BIAS}(i-1)+K_1 \cdot y(i)$$

where $S_F(i)$ is the equivalent filtered angular velocity, $S_I(i)$ is the equivalent angular velocity, $S_{BIAS}(i)$ is a corrective factor to be applied to the angular velocity supplied by the gyroscope, $K_0$ is a first gain factor, $K_1$ is a second gain factor, $y(i)$ is a Kalman innovation factor, and i is the i-th iteration of the iteratively repeating in the time interval.

9. The method according to claim 8 wherein the first gain factor ($K_0$) and the second gain factor ($K_1$) are respective pre-determined values.

10. A system for real-time calibration of a gyroscope configured to supply an angular velocity that is a function of a first rotation angle about a first angular-sensing axis (x), comprising:
    calibration circuitry coupled to the gyroscope, the calibration circuitry configured to calibrate the gyroscope in real time, the calibration circuitry including:
        a register, configured to store a discrete time interval including a plurality of temporal sub-units that includes a first temporal sub-unit;
        an acquisition block, configured to receive from an accelerometer, in the first temporal sub-unit, respective values of acceleration along a first acceleration-sensing axis and a second acceleration-sensing axis of the accelerometer;
        an equivalent-angle generator, configured to calculate, in said first temporal sub-unit, based on said acceleration values, an equivalent angular velocity that can be associated to said first rotation angle;

a first adder, configured to calculate, in said first temporal sub-unit, a deviation between the angular velocity and said equivalent angular velocity;

a first counter, configured to update a counter variable based on said deviation;

a register, configured to store an updated value of said deviation during a plurality of iterations of receiving the respective values of acceleration, calculating the equivalent angular velocity, calculating the deviation, and updating the counter variable at each temporal sub-unit, of the plurality of sub-units, subsequent to the first temporal sub-unit, up to an end of the time interval;

a second adder, configured to increment or decrement an offset variable by a first value based on the counter variable; and a third adder, configured to update said angular velocity as a function of said offset variable.

11. The system according to claim 10 wherein the third adder is configured to carry out an algebraic addition between the angular velocity and the offset variable.

12. The system according to claim 10 wherein the equivalent-angle generator is configured to calculate a time derivative of an arctangent of a ratio between the acceleration along the first acceleration-sensing axis of the accelerometer and the acceleration along the second acceleration-sensing axis of the accelerometer.

13. The system according to claim 10, further comprising:
a control logic circuit configured to calculate said deviation, increment said counter variable by a second value if said deviation is greater than zero, and decrement said counter variable by the second value if said deviation is less than zero,
the second adder being configured to increment the offset variable if said counter variable is greater than zero and decrement the offset variable if said counter variable is less than zero.

14. The system according to claim 10, further comprising:
a second counter, configured to store and update, at each iteration of receiving the respective values of acceleration, calculating the equivalent angular velocity, calculating the deviation, and updating the counter variable in the time interval, an initial state variable;
a comparator, configured to receive at input, at each iteration of receiving the respective values of acceleration, calculating the equivalent angular velocity, calculating the deviation, and updating the counter variable in the time interval, the current initial state variable and a temporal sub-interval that is less than the said time interval, and to generate at output a result of a comparison that indicates a first operating condition, in which the current initial state variable is greater than the temporal sub-interval, and a second operating condition, in which the current initial state variable is less than, or equal to, the temporal sub-interval;
a selector, configured to receive at input said result of the comparison and generate at output a multiplexing-control signal that indicates the first operating condition or the second operating condition;
a multiplexer, configured to receive the multiplexing-control signal and generating at output the first value in the case where said result indicates the first operating condition or else a third value, greater than the first value, in the case where said result indicates the second operating condition, said second adder being configured to increment or decrement the offset variable by the first value during the first operating condition and to increment or decrement the offset variable by the third value during the second operating condition.

15. The system according to claim 10, further comprising a filter, of a low-pass type, configured to filter said equivalent angular velocity to generate an equivalent filtered angular velocity.

16. The system according to claim 10, further comprising a filter, configured to receive at input the angular velocity and the equivalent angular velocity, to carry out a filtering based upon Kalman filtering of the angular velocity and of the equivalent angular velocity, and generate at output an equivalent filtered angular velocity, said filter to implement the equations:

$$S_F(i)=S_I(i)+K_0 \cdot y(i)$$

$$S_{BIAS}(i)=S_{BIAS}(i-1)+K_1 \cdot y(i)$$

where $S_F(i)$ is the equivalent filtered angular velocity, $S_I(i)$ is the equivalent angular velocity, $S_{BIAS}(i)$ is a corrective factor to be applied to the angular velocity supplied by the gyroscope, $K_0$ is a first gain factor, $K_1$ is a second gain factor, $y(i)$ is a Kalman innovation factor, and i is the i-th iteration of the plurality of iterations in the time interval.

17. The system according to claim 16 wherein the first gain factor ($K_0$) and the second gain factor ($K_1$) are a-respective pre-determined values.

18. An electronic device, comprising:
a gyroscope having a plurality of sensing axes and configured to supply a respective angular velocity for each of the sensing axes;
an accelerometer having a plurality of sensing axes; and
a plurality of calibration systems, each calibration system including:
a register configured to store a discrete time interval;
an acquisition block configured to receive from the accelerometer values of acceleration;
an equivalent-angle generator configured to calculate an equivalent angular velocity;
a first adder configured to calculate a deviation between the angular velocity and said equivalent angular velocity;
a first counter configured to update a counter variable based on the deviation;
a register configured to store an updated value of the deviation during a plurality of iterations through the register, the acquisition block, the equivalent-angle generator, the first adder, and the first counter for a plurality of sub-units of the time interval;
a second adder configured to increment or decrement an offset variable by a first value based on a parameter of a value assumed by the counter variable; and
a third adder configured to update the angular velocity as a function of the offset variable.

19. The device of claim 18 wherein each calibration system is configured to:
receive at input a respective angular velocity regarding a respective sensing axis of the gyroscope, said angular velocity being affected by an error variable in time;
receive at input a respective pair of acceleration values associated to a respective pair of sensing axes of said accelerometer and said magnetometer; and
supply at output a correct angular velocity, correlated to said value of angular velocity, and wherein the time-variable error component is, at least partially, compensated.

20. The device of claim 18, further comprising:
a control logic configured to calculate said deviation, to increment said counter variable by a second value if said deviation is greater than zero, and to decrement said counter variable by the second value if said deviation is less than zero, the second adder being configured to increment the offset variable if said counter variable is greater than zero and decrement the offset variable if said counter variable is less than zero.

21. The device of claim 18, further comprising a magnetometer.

\* \* \* \* \*

UNITED STATES PATENT AND TRADEMARK OFFICE
CERTIFICATE OF CORRECTION

| | | |
|---|---|---|
| PATENT NO. | : 10,088,333 B2 | Page 1 of 1 |
| APPLICATION NO. | : 14/444920 | |
| DATED | : October 2, 2018 | |
| INVENTOR(S) | : Daniele Mangano | |

It is certified that error appears in the above-identified patent and that said Letters Patent is hereby corrected as shown below:

On the Title Page

Item (72) Inventor:
"Daniele Mangano, San Gregorio di Catania (JP)" should read, --Daniele Mangano, San Gregorio di Catania (IT)--.

Signed and Sealed this
Nineteenth Day of March, 2019

Andrei Iancu
*Director of the United States Patent and Trademark Office*